United States Patent
Hoshide et al.

(10) Patent No.: US 6,778,340 B2
(45) Date of Patent: Aug. 17, 2004

(54) LENS MOUNTING MECHANISM AND PROJECTOR APPARATUS

(75) Inventors: Kaoru Hoshide, Tokyo (JP); Minoru Kouchi, Tokyo (JP); Kentaro Eto, Tokyo (JP); Takashi Ogata, Tokyo (JP)

(73) Assignee: THK Co., Ltd., Tokyo (JP)

( * ) Notice: Subject to any disclaimer, the term of this patent is extended or adjusted under 35 U.S.C. 154(b) by 0 days.

(21) Appl. No.: 10/637,582

(22) Filed: Aug. 11, 2003

(65) Prior Publication Data

US 2004/0027692 A1 Feb. 12, 2004

(30) Foreign Application Priority Data

Aug. 12, 2002 (JP) ...................................... P2002-234546
Oct. 13, 2002 (JP) ...................................... P2002-318882

(51) Int. Cl.$^7$ ............................................... G02B 7/02
(52) U.S. Cl. ........................ 359/827; 359/702; 359/819
(58) Field of Search ................................. 359/827, 694, 359/699–703, 711, 811, 819

(56) References Cited

U.S. PATENT DOCUMENTS

| | | | |
|---|---|---|---|
| 4,302,077 A | 11/1981 | Sato et al. .................. | 359/828 |
| 5,054,886 A | * 10/1991 | Ozaki et al. ................. | 359/823 |
| 5,202,706 A | * 4/1993 | Hasegawa .................... | 359/819 |
| 6,452,733 B2 | * 9/2002 | Verbiest ...................... | 359/827 |
| 6,469,839 B2 | * 10/2002 | Agata .......................... | 359/694 |

* cited by examiner

Primary Examiner—Georgia Epps
Assistant Examiner—M. Hasan
(74) Attorney, Agent, or Firm—Westerman, Hattori, Daniels & Adrian, LLP

(57) ABSTRACT

In a lens mounting mechanism, by rotating a ring member through touching lugs of the ring member and aligning grooves of a base member and recesses of the ring member in the circumferential direction, and then inserting a lens barrel into a hole portion, the lens barrel is moved to the hole portion without being interfered by projections of a barrel mounting member, so that the lens barrel can be inserted into the hole portion until a flange portion abuts against an opening end surface. Then, by touching the lugs of the ring member and rotating the ring member to displace the recesses from the grooves of the base member in the circumference direction, the projection of the barrel mounting member is locked by the ring member and the barrel mounting member is fixed to the base member, so that the lens barrel can be mounted to the apparatus body.

7 Claims, 12 Drawing Sheets

LENS MOUNTING MECHANISM AND PROJECTOR APPARATUS

BACKGROUND OF THE INVENTION

1. Field of the Invention

The present invention relates to a projector apparatus used for a projector type image display apparatus for displaying a projected image on a screen, and more particularly to a lens mounting mechanism for mounting and dismounting a lens barrel.

2. Description of the Related Art

An example of construction of a projector apparatus in the related art will be described. The projector apparatus is provided in an enclosure with a light source such as metal halide lamp, a dichroic mirror for separation, a reflection mirror, a liquid crystal panel, a dichroic mirror for photosynthesis, an optical path adjusting mechanism including a pair of liquid prisms, and a projecting lens.

A light beam emitted from the light source is divided into Red, Blue, and Green three primary colors by the dichroic mirror for separation. The coefficient of transmission of the divided light beams is modulated depending on image information of the respective color components at the liquid crystal panel on the respective optical path. The modulated light beam is combined by the dichroic mirror for photosynthesis. The combined light beam is extended and projected on a screen by a projecting lens after the optical path thereof is adjusted by the optical path adjusting mechanism.

The projector apparatus for extended projection an image as described above is used at places under different conditions in which the distances to the screen and/or the sizes of the screen differ from each other.

Therefore, in order to improve the image accuracy, such difference in conditions are compensated by replacing lenses of the projector apparatus.

In the case where the lens can be replaced, it is convenient such that an alternate lens can be used for repair and the like, or only the lens unit can be replaced when replacement of a lens component is required.

Figure 12:
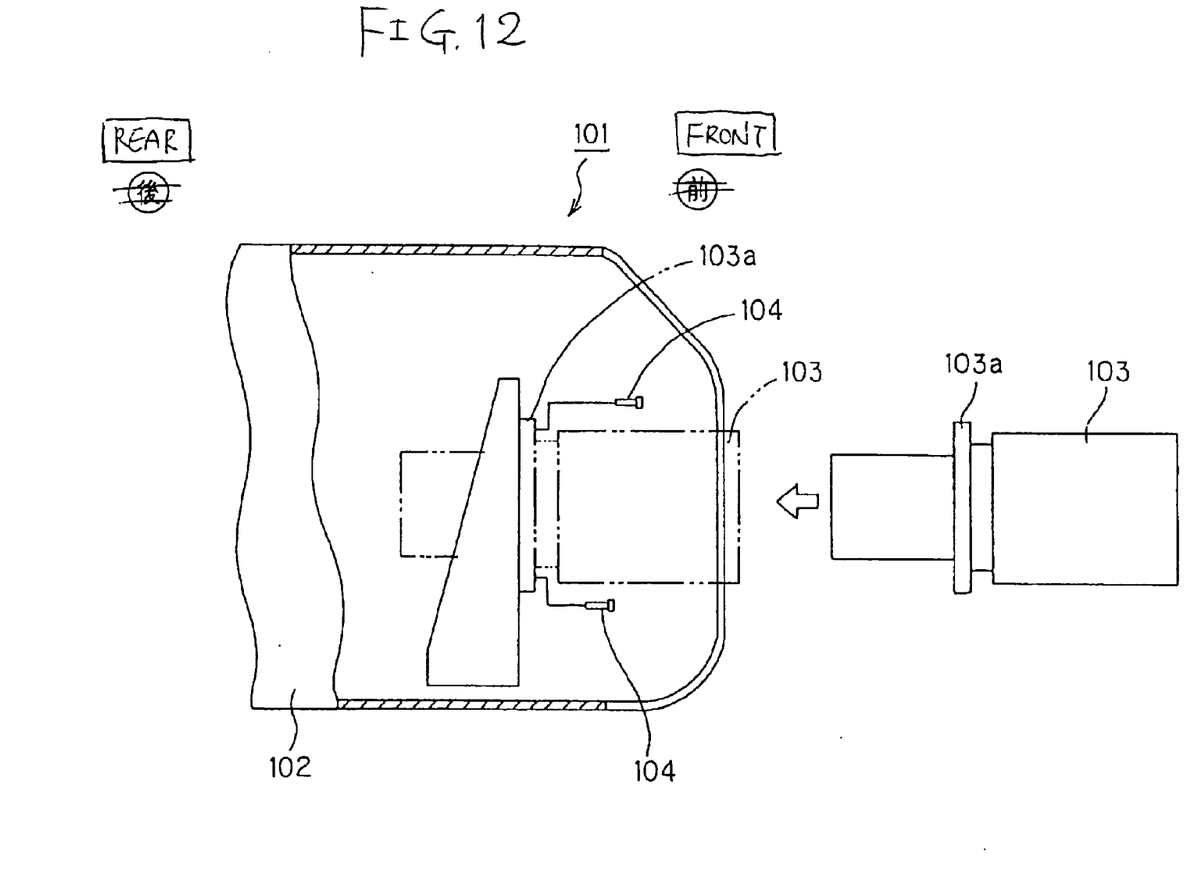
FIG. 12 is a drawing showing a projector apparatus according to a related art.

The way to replace the lens of the projector apparatus in the related art will be described. FIG. 12 is a schematic view, partially broken away, of a projector apparatus in the related art showing a portion where the lens is replaced.

In FIG. 12, a projector apparatus 101 is mainly composed of an apparatus body 102 and a lens barrel 103. The lens barrel 103 is provided with a lens disposed therein and thus the lens can be replaced by replacing the lens barrel 103.

A method of mounting the lens barrel 103 employed in the related art is such that four points on the flange portion 103a of the lens barrel 103 are secured to predetermined positions of the apparatus body 102 with screws 104, as shown in FIG. 12.

However, in the related art, when the projector apparatus is significantly bulky, the lens barrel itself is quite heavy, and thus is hard to deal with. Furthermore, since the outer diameter is also large, when it is rotated, it may interfere with peripheral components and become damaged. Therefore, it is difficult to mount and dismount the heavy lens barrel while keeping the posture and the position stable.

In particular, since the lens barrel is bulky, and thus the space around the lens barrel is limited, the operator is hard to insert his/her hand for lifting the lens barrel, and the only possible way is to secure it with screws using a specific tool, which is not preferable in workability.

In addition, the operation itself is very troublesome because it requires a plurality of operators including a person who lift the lens barrel and a person for screwing with the specific tool.

SUMMARY OF THE INVENTION

In view of such circumstances, an object of the present invention is to provide a lens mounting mechanism and a projector apparatus in which mounting and dismounting of the lens barrel can be performed easily.

In order to achieve the object described above, a lens mounting mechanism according to the present invention includes:

a barrel mounting member mountable on an outer periphery of a lens barrel having a lens disposed therein, the barrel mounting member having a cylindrical portion a flange portion extending radially outwardly from one end of the cylindrical portion, and projections projecting radially outwardly from the other end circumferential plural positions of the cylindrical portion;

a base member fixed to an apparatus body to which the lens barrel is mounted, the base member having a hole portion through which the cylindrical portion is inserted together with the lens barrel, a groove formed on an inner periphery of the hole portion for enabling the projections to be inserted, and an opening end surface of the hole portion to which the flange portion is abutted; and a ring member rotatably disposed in a state of being clamped by the base member, the ring member having a recess on an inner periphery thereof for enabling the projections to be inserted in the same manner as the groove, wherein the lens barrel is mounted to the apparatus body by rotating the ring member and aligning the groove on the base member and the recess on the ring member in the circumference direction, inserting the lens barrel into the hole portion until the flange portion of the barrel mounting member abuts against the opening end surface, and subsequently rotating the ring member for displacing the recess and the groove in the circumferential direction so that the projections are locked by the ring member and thus the barrel mounting member is fixed.

Therefore, the lens barrel can be mounted only by inserting the flange portion of the barrel mounting member abuts against the opening end surface and then rotating the ring member.

Therefore, if the lens barrel can be inserted while aligning the projections of the barrel mounting member along the groove of the hole portion of the base member, the heavy lens barrel can be mounted and dismounted while keeping the posture and the position stable.

Since insertion can be made with the posture and the position of the lens barrel kept stable and the mounting and dismounting can be performed only by one-touch operation only by rotating the ring member without using the specific tool for fixation, workability is improved and the operation can be performed by a single operator.

Preferably, the lens mounting mechanism is provided with an urging device for urging the projections in a lens barrel insertion direction when the projections are locked by the ring member.

Accordingly, the barrel mounting member can be fixedly secured, and rattling of the lens barrel is prevented.

Preferably, the urging device has a bent portion formed by bending a portion of the ring member for locking the projections in the lens barrel insertion direction.

Accordingly, the projection can be urged by being pushed by the bent portion of the ring member.

Preferably, the spring device has a spring member including a leaf spring formed at a position for locking the projections, the spring member stacked on a side of the lens barrel insertion direction of the ring member.

Accordingly, the projections can be urged by being pressed by the leaf spring.

Preferably, the lens mounting mechanism is provided with a locking mechanism for positioning the ring member at a position where the grooves and the recesses are aligned in the circumferential direction and at a position where the grooves are displaced from the recesses in the circumferential direction.

Accordingly, accuracy of positioning of the ring member when moved circumferentially is improved.

Preferably, the locking mechanism includes a positioning hole formed on the base member; a fixed member fixedly mounted to the ring member; a sliding member having a projection to be engaged with the positioning hole and being slidably mounted to the fixed member so as to be capable of releasing engagement of the projection with the positioning hole; and a second urging device for urging the sliding member in a direction in which the projection engages the positioning hole, wherein the engagement of the projection with respect to the positioning hole is released to allow the ring member to rotate by sliding the sliding member against the urging force of the second urging device, and the ring member is positioned at the position where the groove and the recess are aligned in the circumferential direction and at the position where the groove is displaced from the recess in the circumferential direction by engaging the projection with the positioning hole.

Accordingly, by sliding the sliding member, the projection can be pulled out from the positioning hole and engagement between the projection for positioning and the positioning hole is released. In addition, since the sliding member slides in the engaging direction spontaneously by an urging force of the second urging device if no force is exerted to the sliding member in the sliding state, the operation of the operator may be significantly simplified.

A projector apparatus according to the present invention includes the lens mounting mechanism; the lens barrel which is mountable and dismountable by the lens mounting mechanism; and the apparatus body to which the lens barrel is mounted.

DETAILED DESCRIPTION OF THE PREFFERD EMBODIMENTS (First Embodiment)

Referring now to FIG. 1 to FIG. 4, a first embodiment of the present invention will be described.

Figure 1:
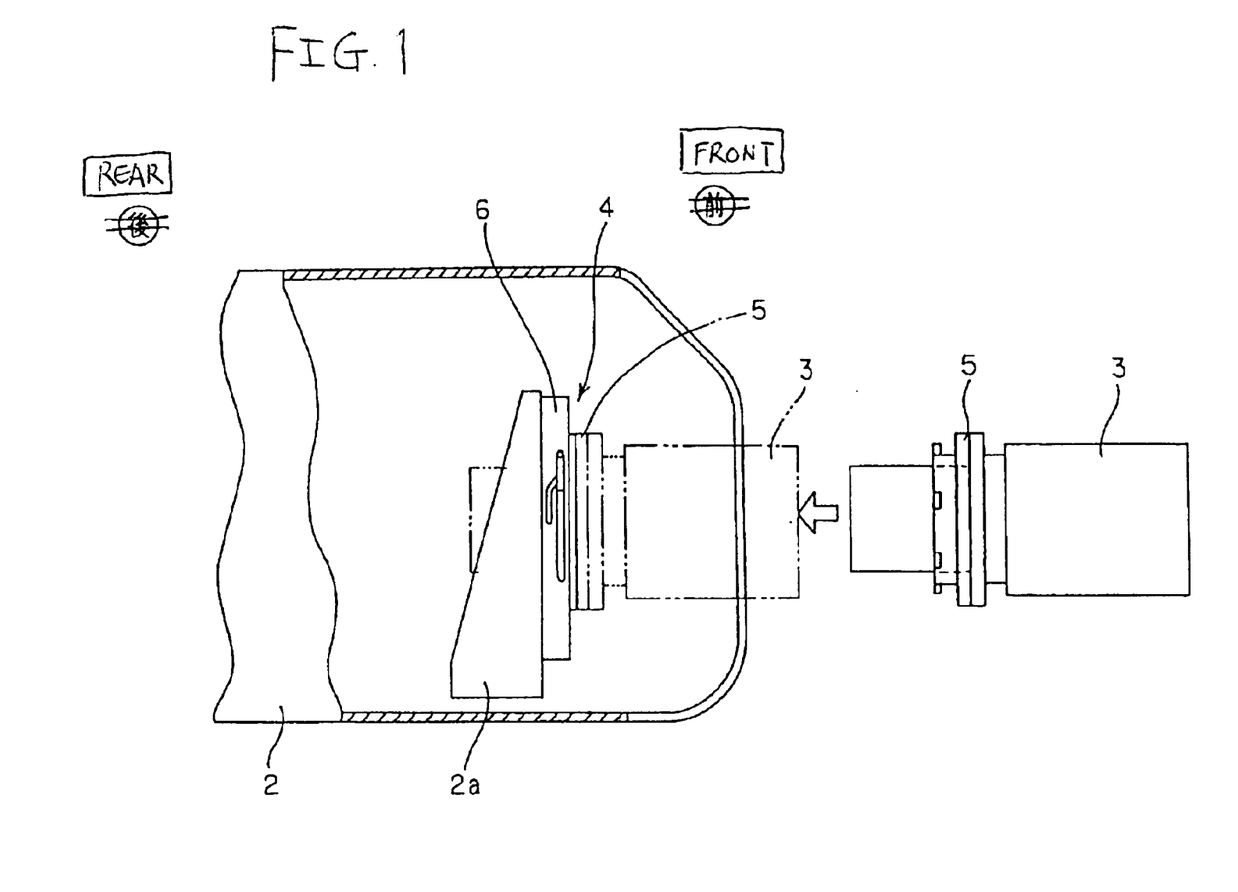
FIG. 1 is a drawing showing a projector apparatus according to a first embodiment.

FIG. 1 is a drawing showing a projector apparatus 1 according to the first embodiment. The projector apparatus 1 in FIG. 1 includes an apparatus body 2 including a box-shaped enclosure and a lens barrel 3 mounted thereto. In FIG. 1, especially a portion where a lens is replaced is shown with part of it broken.

The projector apparatus 1 includes the apparatus body 2, the lens barrel 3 with a lens disposed therein, and a lens mounting mechanism 4 for mounting the lens barrel 3 to the apparatus body 2.

The apparatus body 2 includes a light source, various mirrors, an image display panel, a lens barrel moving mechanism, and so on, though they are not shown in the drawing.

The lens barrel 3 includes a lens corresponding to each of various conditions, such as a distance to a screen to be projected, the size of the screen, and so on disposed therein.

In the projector apparatus 1, a light beam emitted from the light source is modulated in coefficient of transmission en route at the image display panel according to image information while being reflected by various mirrors and thus changed in direction, and then passed through the lens barrel 3 and extendedly projected on the screen.

Figure 2:
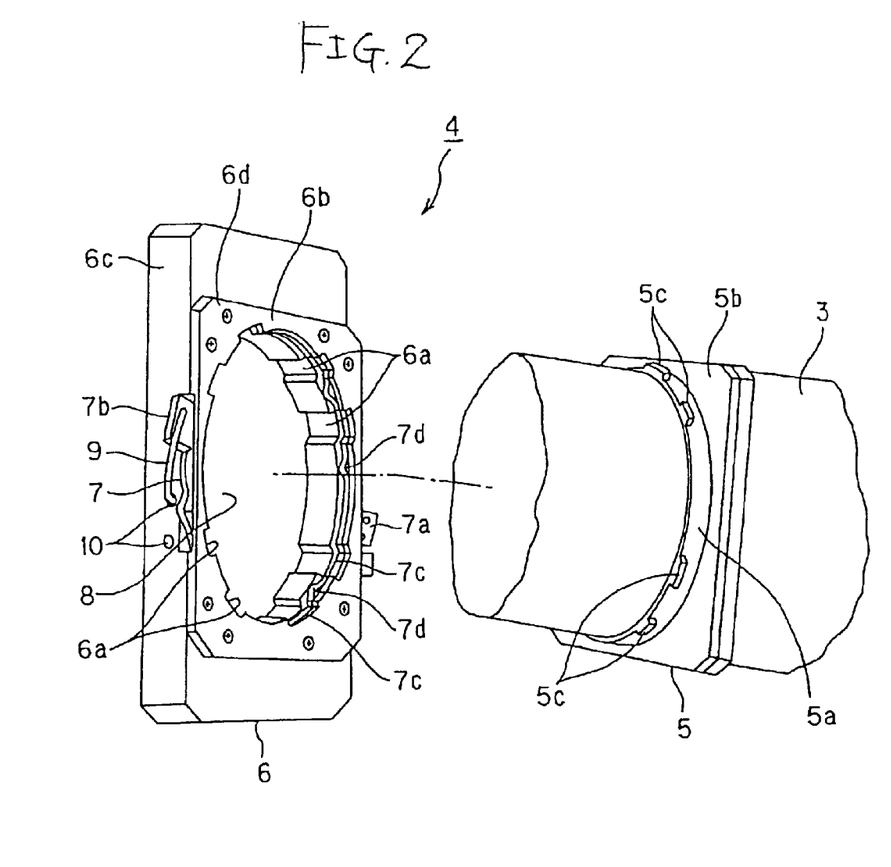
FIG. 2 is a drawing showing a lens mounting mechanism according to the first embodiment.

The lens mounting mechanism 4 is shown in FIG. 2 in detail in an enlarged manner. In FIG. 2, the lens mounting mechanism 4 includes a barrel mounting member 5 attached to the outer periphery of the cylindrical lens barrel 3, a base member 6 fixed to a base 2a of the apparatus body 2, and a ring member 7 rotatably disposed in a state of being clamped by the base member 6.

The barrel mounting member 5 includes a cylindrical portion 5a through which the lens barrel 3 is inserted, a square flange portion 5b extending radially outwardly from one end of the cylindrical portion 5a, and projections 5c projecting radially outwardly from the other end of the cylindrical portion 5a at a plurality of positions in the circumferential direction. The cylindrical portion 5a is mounted and fixed to the outer periphery of the lens barrel 3, and fixed to the lens barrel 3.

On the other hand, the base member 6 is provided with a hole portion 8 to which part of the lens barrel 3 is inserted at the center thereof. The opening diameter of the hole portion 8 is slightly larger than the outer diameter of the cylindrical portion 5a.

The base member 6 defining the hole portion 8 is formed with a groove 6a on the inner peripheral surface thereof so that the projections 5c of the barrel mounting member 5 projecting radially outwardly from the cylindrical portion 5a can be inserted into the hole portion 8 together with the lens barrel 3. A plurality of grooves 6a are formed so that the circumferential positions thereof corresponds to those of the projections 5c, thereby enabling insertion of the lens barrel 3. In this embodiment, the number of projections 5c and the grooves 6a formed along the circumference thereof is eight.

The opening end surface 6b on the side of the base member 6 through which the lens barrel 3 is inserted is a portion where the flange portion 5b of the barrel mounting member 5 finally abuts where the lens barrel 3 is inserted into the hole portion 8 of the base member 6 together with the barrel mounting member 5.

Figure 3A:
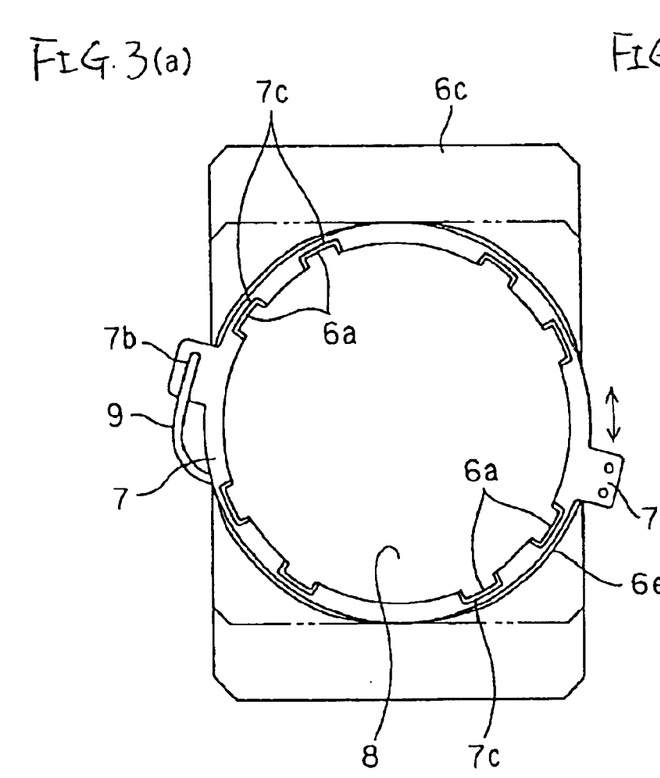
FIGS. 3(a) and 3(b) are drawings showing a principal portion of the lens mounting mechanism according to the first embodiment.
Figure 3B:
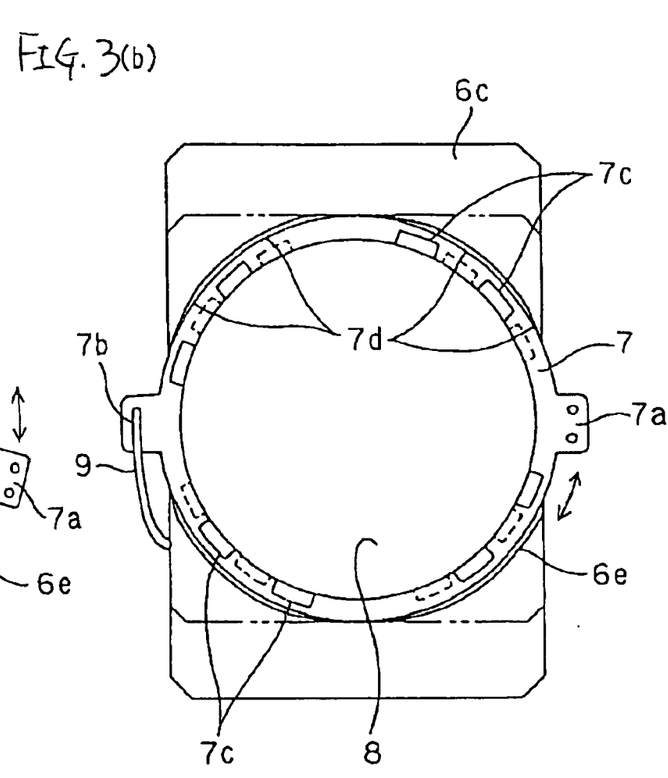

The base member 6 includes a base body 6c, and a holding plate 6d that has the opening end surface 6b on the side of the barrel mounting member 5. The base body 6c is formed with a trench 6e corresponding to the outer configuration of the ring member 7 so that the ring member 7 can rotate concentrically with the hole portion 8 as shown in FIGS. 3(a) and 3(b), in which the holding plate 6d of the base member 6 is not shown. Then, with the ring member 7 disposed in the trench 6e of the base body 6c, the holding plate 6d is secured to the base body 6c from above the ring member 7 with screws so that the ring member 7 cannot be taken out. Accordingly, the ring member 7 is clamped without displacement of the center thereof with respect to the base member 6 so as to be rotatable in the circumferential direction.

The ring member 7 is formed into an annular shape as shown in FIGS. 3(a) and 3(b). The inner periphery of the ring member 7 defines a hole having substantially the same diameter as the hole portion 8. The ring member 7 is formed with a pair of lugs 7a, 7b on the outer periphery thereof so as to project from the base member 6. Therefore, the operator can rotate the ring member 7 by touching the lugs 7a, 7b.

The ring member 7 is formed with recesses 7c having the same shape and the same number as the grooves 6a for enabling insertion of the projections 5c like the grooves 6a formed on the inner periphery of the base member 6 which defines the hole portion 8.

The state shown in FIGS. 3(a) and 3(b) will be described. In FIG. 3(a), the grooves 6a and the recesses 7c are aligned with each other in the circumferential direction, so that when the lens barrel 3 is inserted into the base member 6, the projections 5c of the barrel mounting member 5 can also be inserted into the hole portion 8.

On the other hand, in FIG. 3(b), the recesses 7c are located at the different positions from those of the grooves 6a in the circumferential direction, and the grooves 6a are blocked by the ring member 7 as shown by broken lines. Therefore, in the state shown in FIG. 3(b), the projections 5c abuts against the ring member 7, and thus the lens barrel 3 cannot be inserted into the base member 6.

On the other hand, when the ring member 7 is rotated form the state shown in FIG. 3(a) to the state shown in FIG. 3(b) after insertion of the lens barrel 3 into the base member 6 is completed, the projections 5c are locked by the ring member 7, and thus the member 6. In other words, the lens barrel 3 is mounted to the apparatus body 2.

Now, it is necessary to prevent the lens barrel 3 from sliding in the direction of insertion or in the opposite direction from the direction of insertion and rattling when the projections 5c are locked by the ring member 7. Therefore, the dimensions are determined so that the projections 5c are locked by the ring member 7 in a state in which the lens barrel 3 is inserted until the flange portion 5b of the barrel mounting member 5 abuts against the opening end surface 6b of the base member 6.

Based on the construction described above, mounting of the lens barrel 3 will be described. In a first place, the ring member 7 is rotated by touching the lugs 7a, 7b of the ring member 7 so that the grooves 6a of the base member 6 and the recesses 7c of the ring member 7 are aligned in the circumferential direction, and then the lens barrel 3 is inserted into the hole portion 8. Then the projections 5c of the barrel mounting member 5 move through the grooves 6a of the hole portion 8 and the recesses 7c without being interfered by the ring member 7, so that the lens barrel 3 can be inserted into the hole portion 8 until the flange portion 5b abuts against the opening end surface 6b.

Then, by touching the lugs 7a, 7b of the ring member 7, and rotating the ring member 7 to displace the recesses 7c from the grooves 6a of the base member 6 in the circumferential direction, the projections 5c of the barrel mounting member 5 are locked by the ring member 7, and thus the barrel mounting member 5 can be fixed to the base member 6 and the lens barrel 3 is mounted to the apparatus body 2.

When the procedure described above is performed in the reverse order, the lens barrel 3 can be detatched from the apparatus body 2. In other words, the lens barrel 3 can be separated from the apparatus body 2 by rotating the ring member 7 from a state in which the recesses 7c served to fix the lens barrel 3 to the apparatus body 2 by the projections 5c of the barrel mounting member 5 locked by the ring member 7 is displaced from the groove 6a in the circumferential direction to a state in which the grooves 6a and the recesses 7c are aligned in the circumferential direction, and pulling the lens barrel 3 out therefrom.

As described above, according to the present embodiment, mounting of the lens barrel 3 is achieved only by aligning the grooves 6a and the recesses 7c in the circumferential direction, inserting the lens barrel 3 into the hole portion 8 formed on the base member 6 until the flange 5b of the barrel mounting member 5 abuts against the opening end surface 6b, and displacing the recesses 7c from the grooves 6a in the circumferential direction by rotating the ring member 7.

Therefore, if the projections 5c of the barrel mounting member 5 can he inserted along the grooves 6a of the hole portion 8 on the base member 6, the lens barrel 3 can be mounted and dismounted while stabilizing the posture and the position of the heavy lens barrel 3.

As described above, since the lens barrel 3 can be inserted while stabilizing the posture and the position thereof, and mounting and dismounting thereof can be performed by one-touch operation only by rotating the ring member 7 without any specific tool, workability is improved and thus the operation itself can be performed by a single operator.

The ring member 7 in this embodiment has the following characteristic as well. In other words, the ring member 7 is provided with bent portions 7d as urging devices formed by bending the ring member 7 at the positions which are locked when the recesses 7c are displaced from the grooves 6a in the circumferential direction in the direction of insertion of the lens barrel 3.

Figure 4A:
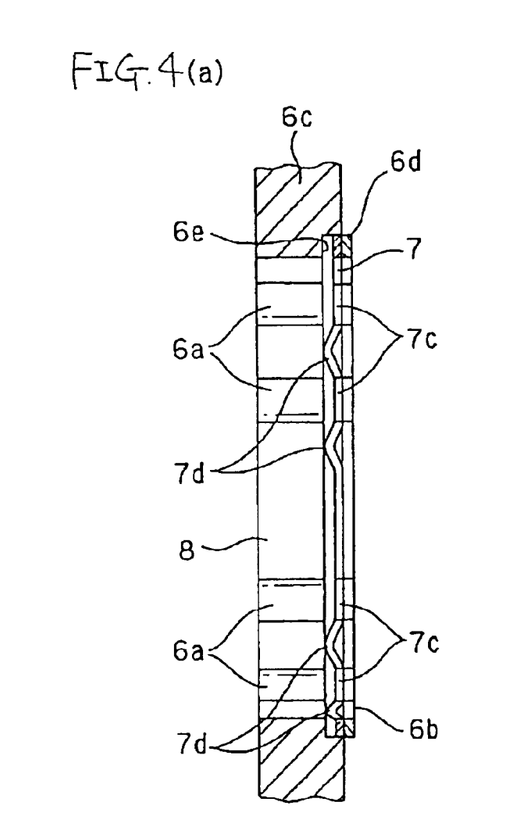
FIGS. 4(a) and 4(b) are drawings showing a principal portion of the lens mounting mechanism according to the first embodiment.
Figure 4B:
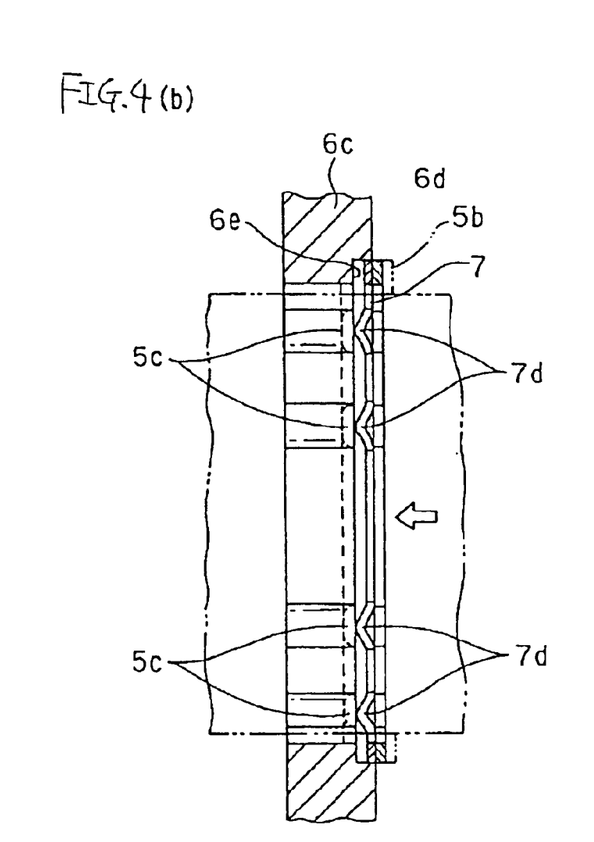

The bent portions 7d project with respect to the plane portion in the direction of insertion of the lens barrel 3 (toward the depth side from the entrance of insertion) as indicated by an arrow in FIG. 4(b), and urge the projections 5c of the barrel mounting member 5 by pressing the same in the direction of insertion by resiliency of the bent portions 7d themselves. Therefore, the barrel mounting member 5 is maintained in a state in which the flange portion 5b positively abuts against the open end surface 6b. Consequently, the barrel mounting member 5 can be fixedly secured to the base member 6, thereby preventing the lens barrel 3 from rattling with respect to the apparatus body 2.

The bent portions 7d are positioned in a gap at the locations different from the grooves 6a in the circumferential direction as shown in FIG. 4(a) in a state in which the grooves 6a and the recesses 7c are aligned in the circumferential direction.

The ring member 7 is provided with a lever 9 as a locking mechanism at one lug 7b for limiting the rotational position. The lever 9 has a spring property and the tip thereof engages holes 10 formed on the base body 6c of the base member 6. The holes 10 for the lever 9 are, as shown in FIG. 2, formed at two locations; the position at which the grooves 6a and the recesses 7c are aligned in the circumferential direction, and the position where the grooves 6a and the recesses 7c are displaced in the circumferential direction.

By engagement between the lever 9 and the holes 10, the position of movement of the ring member 7 in the circumferential direction can preferably be controlled, and the accuracy of the position of the ring member 7 can be improved.

Besides the lever 9, a similar locking mechanism can be achieved by providing an engaging mechanism constructed of a projection and a recess on the ring member 7 and the base member 6 at the predetermined position.

The projector apparatus is provided with the lens barrel moving mechanism mounted thereon, though it is not shown. The lens barrel moving mechanism is a mechanism for moving the lens barrel along guide rails extending in the vertical direction and in the lateral direction, in which the lens barrel is shifted and adjusted in the vertical direction or in the lateral direction by moving the racks corresponding to the respective guide rails by two drive sources.

(Second Embodiment)

Figure 5:
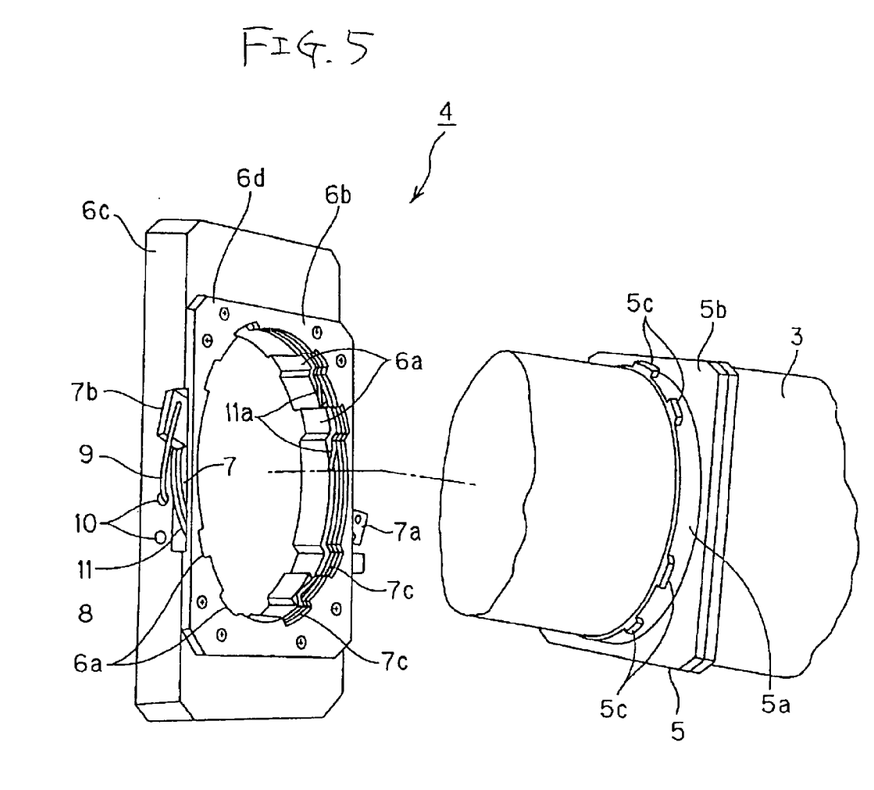
FIG. 5 is a drawing showing a lens mounting mechanism according to a second embodiment.
Figure 6:
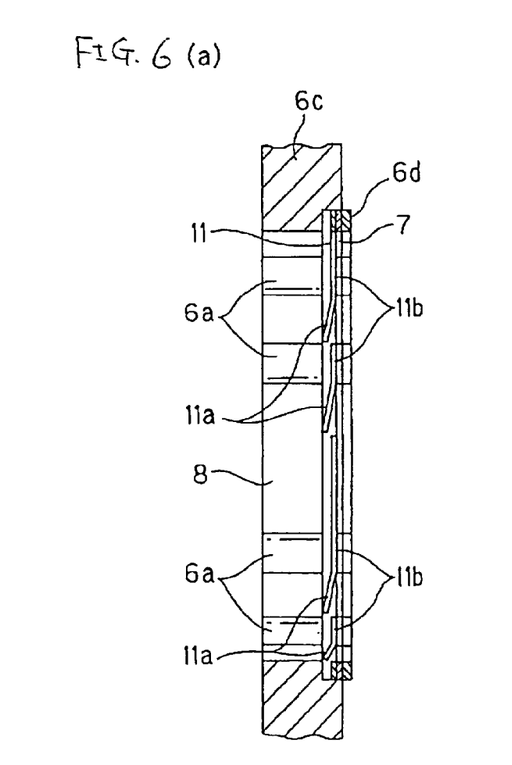
FIGS. 6(a) and 6(b) are drawings showing a principal portion of the lens mounting mechanism according to the second embodiment.
Figure 7:
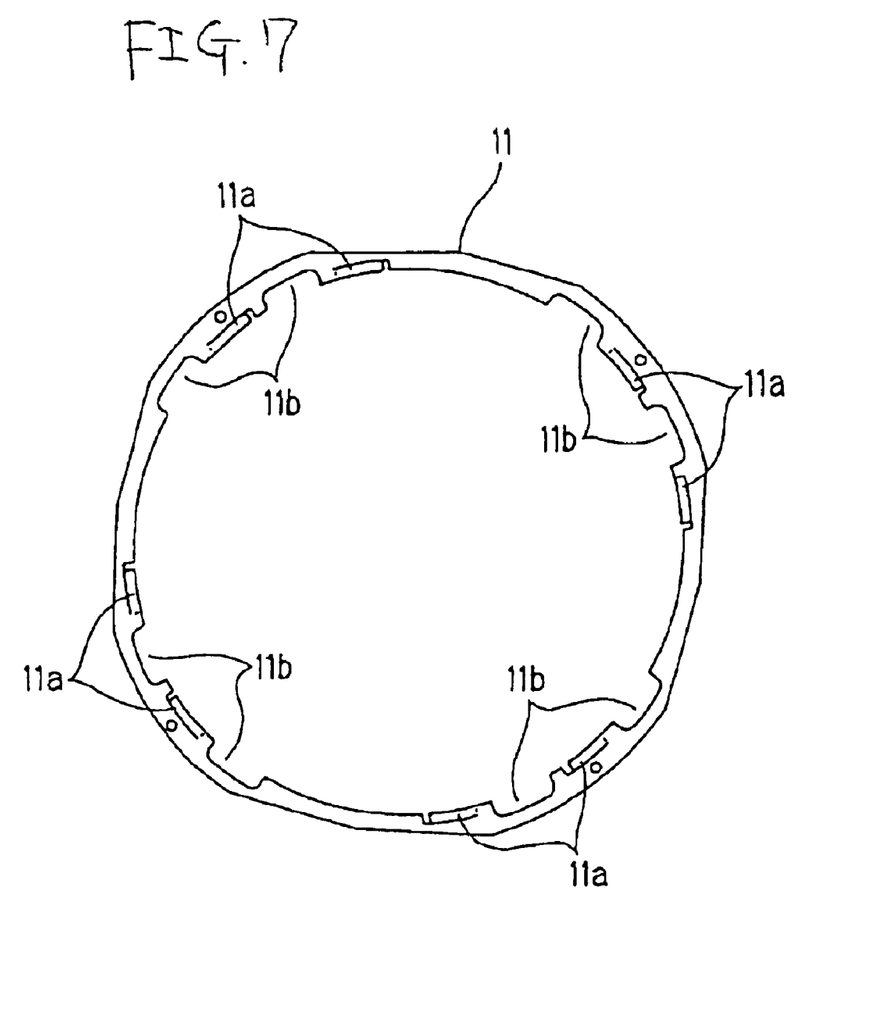
FIG. 7 is a drawing showing a spring member according to the second embodiment.

Referring now to FIG. 5 to FIG. 7, a second embodiment will be described. Since the entirety of the projector apparatus, and the configuration and the material of the respective members are the same as the first embodiment, description thereof will not be made.

This embodiment differs from the first embodiment in that no bent portion is formed on the ring member 7. Instead, a spring member 11 as an urging device stacked integrally on the ring member 7 is provided.

In other words, a lens mounting mechanism 4 of this embodiment includes a barrel mounting member 5 mounted on the outer periphery of a lens barrel 3, a base member 6 fixed to a base 2a of an apparatus body 2, a ring member 7 rotatably disposed in a state of being clamped by the base member 6, and a spring member 11 stacked integrally on the ring member 7.

The spring member 11 has substantially an annular shape as shown in FIG. 7, and is formed with leaf spring portions 11a having resiliency by itself formed by cutting and raising portions for locking the projections 5c. The spring member 11 is also provided with recesses 11b for allowing the projections 5c of the barrel mounting member 5 to pass as in the case of the ring member.

As indicated by an arrow in FIG. 6(b), since the leaf spring portions 11a of the spring member 11 push and urge the projections 5c of the barrel mounting member 5 in the direction of insertion of the lens barrel 3, the barrel mounting member 5 is maintained in a state in which the flange portion 5b positively abuts against the opening end surface 6b. Therefore, the barrel mounting member 5 is fixedly secured, thereby preventing the lens barrel 3 from rattling with respect to the apparatus body 2.

In a state in which the grooves 6a and the recesses 7c are aligned in the circumferential direction, the leaf spring portion 11a is located at the positions different from the grooves in the circumferential direction as shown in FIG. 6(a). In this state, the recesses 11b of the spring member 11 are aligned with the recesses 7c in the circumferential direction.

In this construction, the same effects as the first embodiment can be obtained.

(Third Embodiment)

Referring now to FIG. 8 to FIG. 11(b), a third embodiment will be described. Since the entire projector apparatus, and the configuration and material of the respective components are the same as those in the first embodiment, and the lens mounting mechanism is the same as that in the second embodiment, description thereof will not be made.

Figure 8:
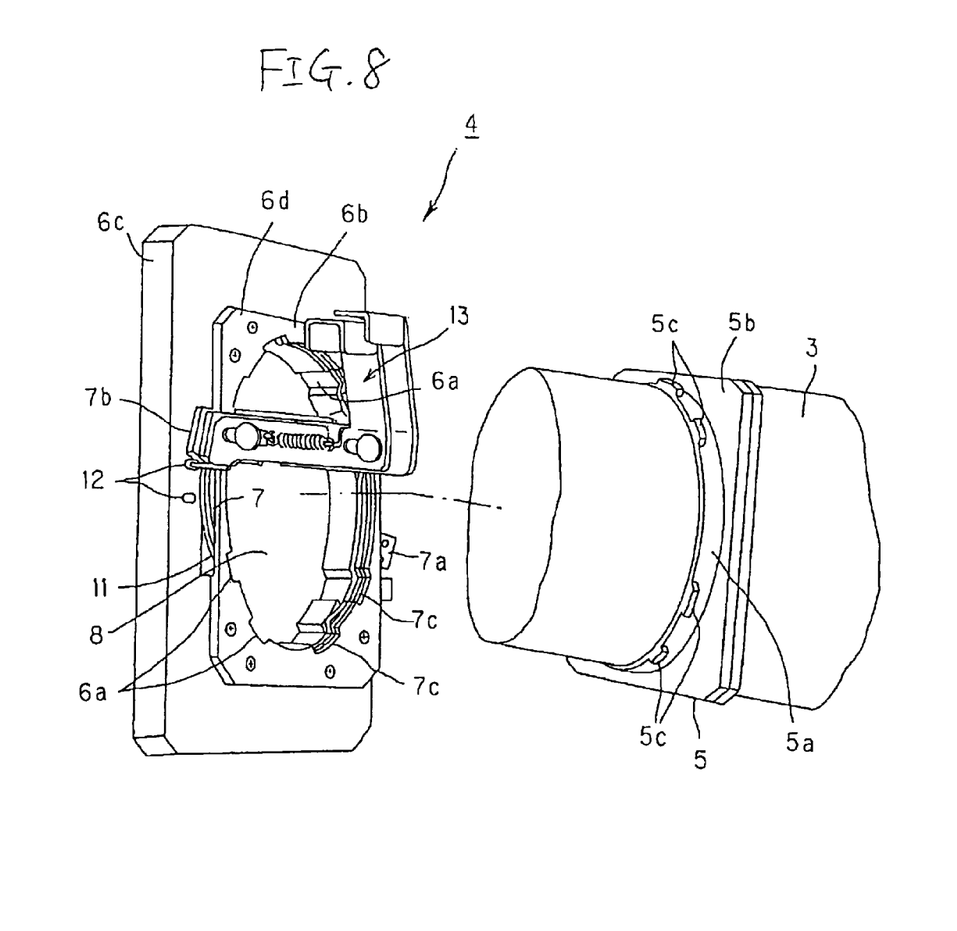
FIG. 8 is a drawing showing a lens mounting mechanism according to a third embodiment.

In this embodiment, as shown in FIG. 8, a locking mechanism which is different from that in the first and the second embodiments described above is employed to the lens mounting mechanism 4 in the second embodiment.

The locking mechanism includes positioning holes 12 formed on a base body 6c, and a lever 13 provided on the ring member 7.

Figure 9A:
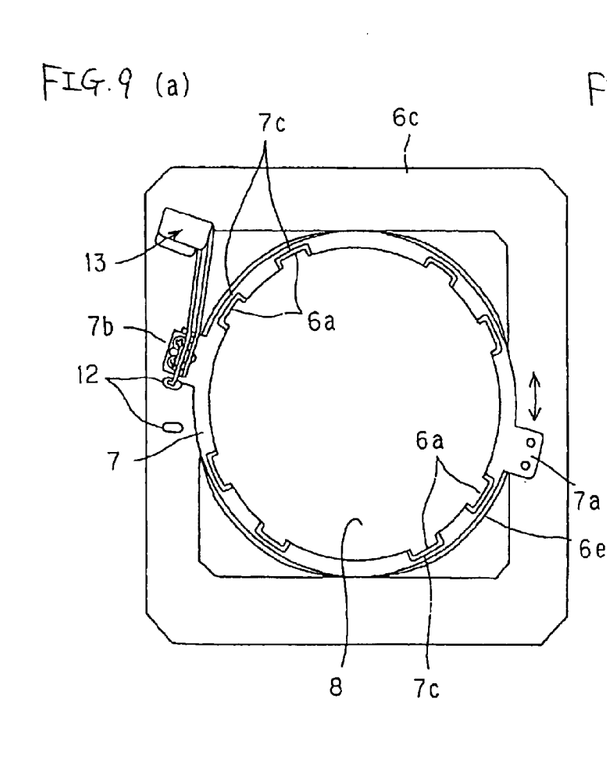
FIGS. 9(a) and 9(b) are drawings showing a principal portion of the lens mounting mechanism according to the third embodiment.
Figure 9B:
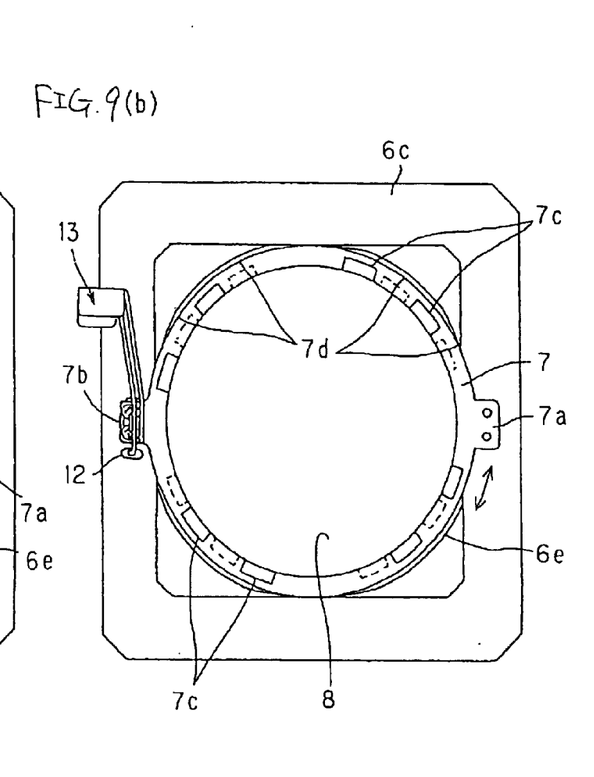

The positioning holes 12 are elliptical holes formed on the surface of the base body 6c, and are formed at two positions so as to engage with a projection 15a on a sliding member 15 constituting the lever 13 both at the position where the grooves 6a and the recesses 7c are aligned in the circumferential direction (FIG. 9(a)) and the position where the grooves 6a are displaced from the recesses 7c in the circumferential direction (FIG. 9(b)).

Figure 10A:
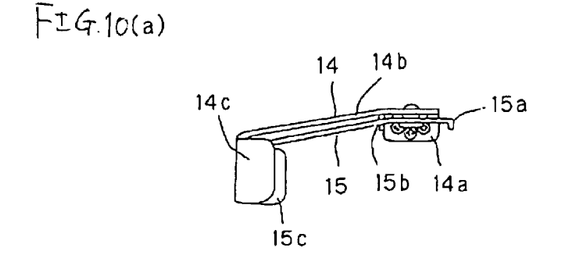
FIGS. 10(a) to 10(c) are drawings showing a lever of the lens mounting mechanism according to the third embodiment.
Figure 10B:
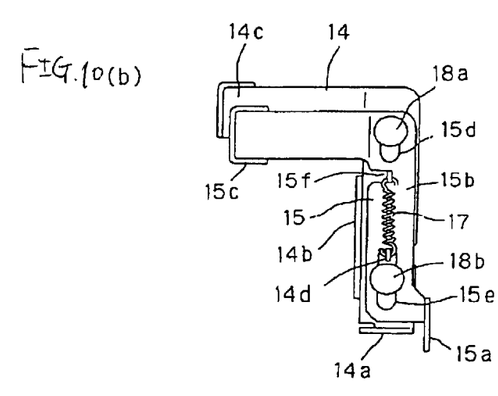
Figure 10C:
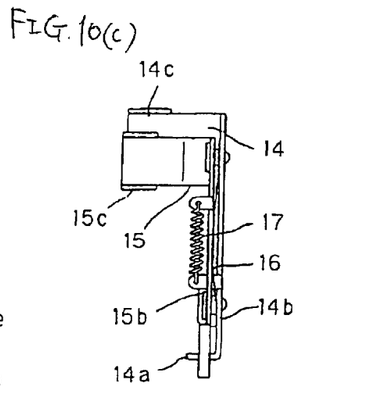

As shown in FIGS. 10(a) to 10(c), the lever 13 includes a fixed member 14 fixedly mounted to the ring member 7, the sliding member 15 having the projection 15a engaging the positioning hole 12 and slidably mounted to the fixed member 14 so as to be capable of releasing engagement of the projection 15a with respect to the positioning hole 12, a leaf spring member 16 being clamped between the fixed member 14 and the sliding member 15, and a coil spring 17 as a second urging device for urging the sliding member 15 in the direction in which the projection 15a engages the positioning hole 12.

The fixed member 14, being thin-plate shape, includes a mounting portion 14a, a body portion 14b, and a tab portion 14c. The fixed member 14 is shaped like a letter L such that the mounting portion 14a is attached to the lug 7b of the ring member 7 with a screw, the body portion 14b extends from the mounting portion 14a vertically with respect to the surface of the ring member 7 and is bent in parallel with the ring member 7, and is formed with the tab portion 14c, which the operator maneuvers, at the end of the body portion 14b opposite from the mounting portion 14a.

The sliding member 15, being thin-plate shape which is substantially the same configuration as the fixed member 14, includes the projection 15a, a body portion 15b, and a tab portion 15c, and is stacked on the fixed member 14. The sliding member 15 is formed with the projection 15a, which engages the positioning hole 12, at the extremity of the L-shaped body portion 15b. The body portion 15b is formed into the same shape as the body portion 14b of the fixed member 14 but relatively smaller, and is formed with the tab portion 15, which the operator maneuvers, is formed at the end of the body portion 15b on the opposite side of the projection 15a.

The sliding member 15 is formed with holes 15d, 15e for sliding movements on the body portion 15b, and pins 18a, 18b fixed to the fixing member 14 are inserted into the holes 15d, 15e for sliding movement. The pins 18a, 18b limit the sliding amount of the sliding member 15 to the extend that the pin 18a can slide in the hole 15d for sliding movement.

The leaf spring member 16 is clamped between the body portion 14b of the fixed member 14 and the body portion 15b of the sliding member 15 in a state of warped in the extending direction. By the leaf spring 16 being clamped between the fixed member 14 and the sliding member 15, a tension is exerted between the fixed member 14 and the sliding member 15 in the direction to move them away from each other, and prevents the sliding member 15 from resonating due to vibrations during operation of the apparatus. In addition, another effect that the sliding member 15 can slide smoothly without being caught by the fixed member 14 is obtained. It is also possible to provide a function of the leaf spring member 16 to one of the fixed member 14 and the sliding member 15 to achieve the same effect without using the leaf spring member 16.

The coil spring 17 is laid between a hook 14d provided on the body portion 14b of the fixed member 14 and projecting from the hole 15e for sliding movement and a hook 15f provided on the body portion 15b of the sliding member 15, and urges in the direction in which the projection 15a engages the projection 15a toward the base body 6c.

The releasing operation of the locking mechanism will be described based on the construction described above. The operation to rotate the ring member 7 from the position where the grooves 6a and the recesses 7c are aligned in the circumferential direction (FIG. 9(a)) to the position where the grooves 6a are displaced from the recesses 7c (FIG. 9(b)) will be described.

Figure 11A:
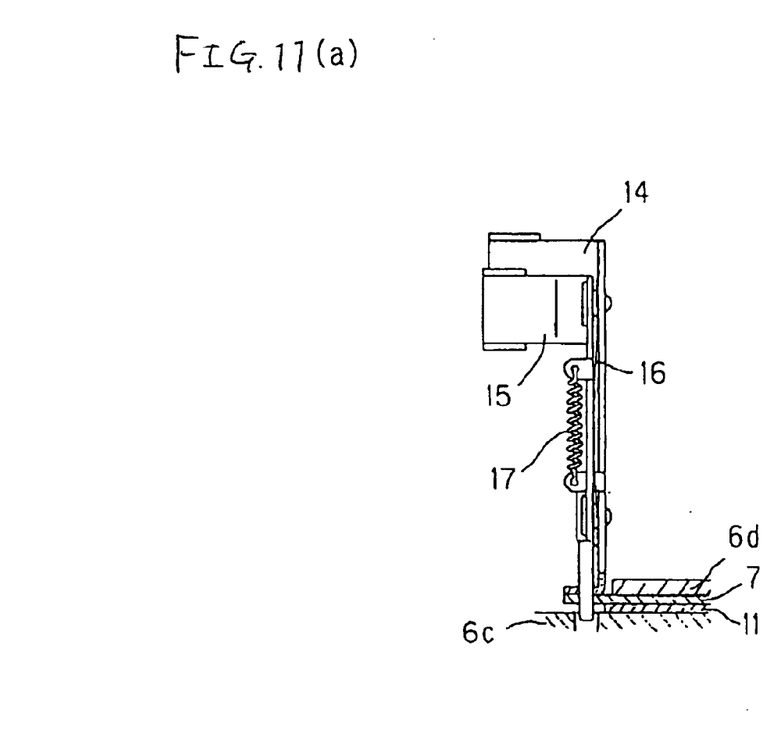
FIGS. 11(a) and 11(b) are drawings showing the lever of the lens mounting mechanism according to the third embodiment.
Figure 11B:
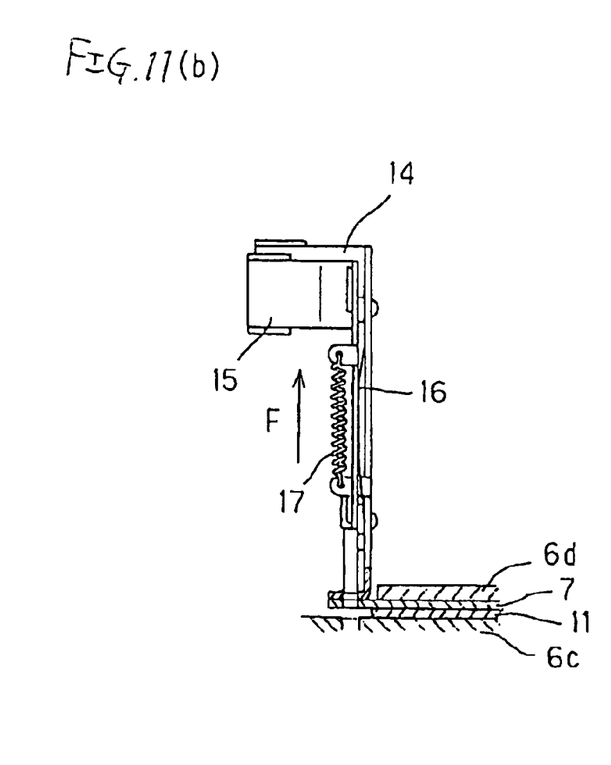

By sliding the sliding member 15 from the state in which the projection 15a of the sliding member 15 engages the positioning hole 12 (FIG. 11(a)) in the direction indicated by an arrow F in the figure against an urging force of the coil spring 17, engagement of the projection 15a with respect to the positioning hole 12 is released so that the ring member 7 is brought into a rotatable sate (FIG. 11(b)).

Sliding movement of the sliding member 15 may be achieved by pulling the tab portion 15c of the sliding member 15 toward the tab portion 14c of the fixed member 14. The pulling operation can be performed easily with one hand by the operator by placing his/her thumb and index finger of one hand respectively on the tab portions 15c, 14c.

Subsequently, the lever 13 is moved to rotate the ring member 7 slightly to the position where the projection 15a is not inserted into the positioning hole 12. Accordingly, even when the operator released a force to slide the sliding member 15, the sliding member 15 is brought into a state in which the projection 15a abuts against the surface of the base body 6c by an urging force of the coil spring 17, so that rotation of the ring member 7 is not affected.

Regardless whether the sliding member 15 is slid or not, by rotating the ring member 7 from the state shown in FIG. 9(a) to the state shown in FIG. 9(b) with the projection 15a abutted against the surface of the base body 6c, the projection 15a is automatically inserted into the positioning hole 12 by an urging force of the coil spring 17 when the ring member 7 is rotated to the desired positioning hole 12.

Therefore, the operator have to perform the sliding operation of the sliding member 15 and the rotating operation of the ring member 7 simultaneously only when releasing the engagement, and thereafter, the operation may be terminated by concentrating on rotating the ring member 7. Therefore, the operation of the operator from releasing of the locking mechanism to rotating of the ring member 7 may further be simplified and facilitated.

As was described, according to the present invention, since the lens barrel is inserted into the hole portion until the flange portion of the barrel mounting member abuts against the opening end surface by aligning the grooves on the base member and recesses on the ring member in the circumferential direction by rotating the ring member, and then the lens barrel is mounted to the apparatus body by displacing the recesses from the grooves in the circumferential direction by rotating the ring member so that the projections are locked by the ring member and thus the barrel mounting member is fixed, the lens barrel can be mounted only by inserting the lens barrel into the hole portion of the base member until the flange portion of the barrel mounting member abuts against the opening end surface, and then rotating the ring member.

Therefore, if the lens barrel can be inserted so that the projections of the barrel mounting member is fitted in the grooves on the hole portion of the base member, the lens barrel can be mounted and dismounted while stabilizing the posture and the position of the heavy lens barrel.

In addition, since the lens barrel can be inserted with the posture and the position thereof stabilized, and mounting and dismounting thereof can be performed by one-touch operation of rotating the ring member without using a specific tool for fixation, workability is improved and the operation itself can be performed by a single operator.

What is claimed is:

1. A lens mounting mechanism comprising:
   a barrel mounting member mountable on an outer periphery of a lens barrel having a lens disposed therein, the barrel mounting member having a cylindrical portion, a flange portion extending radially outwardly from one end of the cylindrical portion, and projections projecting radially outwardly from the other end circumferential plural positions of the cylindrical portion;
   a base member fixed to an apparatus body to which the lens barrel is mounted, the base member having a hole portion through which the cylindrical portion is inserted together with the lens barrel, a groove formed on an inner periphery of the hole portion for enabling the projections to be inserted, and an opening end surface of the hole portion to which the flange portion is abutted; and
   a ring member rotatably disposed in a state of being clamped by the base member, the ring member having a recess on an inner periphery thereof for enabling the projections to be inserted in the same manner as the groove,
   wherein the lens barrel is mounted to the apparatus body by rotating the ring member and aligning the groove on the base member and the recess on the ring member in the circumference direction, inserting the lens barrel into the hole portion until the flange portion of the barrel mounting member abuts against the opening end surface, and subsequently rotating the ring member for displacing the recess and the groove in the circumferential direction so that the projections are locked by the ring member and thus the barrel mounting member is fixed.

2. The lens mounting mechanism according to claim 1, further comprising an urging device for urging the projections in a lens barrel insertion direction when the projections are locked by the ring member.

3. The lens mounting mechanism according to claim 2, wherein the urging device comprises a bent portion formed by bending a portion of the ring member for locking the projections in the lens barrel insertion direction.

4. The lens mounting mechanism according to claim 2, wherein the urging device comprises a spring member including a leaf spring formed at a position for locking the projections, the spring member stacked on a side of the lens barrel insertion direction of the ring member.

5. The lens mounting mechanism according to claim 1, further comprising a locking mechanism for positioning the ring member at a position where the grooves and the recesses are aligned in the circumferential direction and at a position where the grooves are displaced from the recesses in the circumferential direction.

6. The lens mounting mechanism according to claim 5, wherein the locking mechanism comprises:

a positioning hole formed on the base member;

a fixed member fixedly mounted to the ring member;

a sliding member having a projection to be engaged with the positioning hole and being slidably mounted to the fixed member so as to be capable of releasing engagement of the projection with the positioning hole; and a second urging device for urging the sliding member in a direction in which the projection engages the positioning hole, wherein the engagement of the projection with respect to the positioning hole is released to allow the ring member to rotate by sliding the sliding member against the urging force of the second urging device, and the ring member is positioned at the position where the groove and the recess are aligned in the circumferential direction and at the position where the groove is displaced from the recess in the circumferential direction by engaging the projection with the positioning hole.

7. A projector apparatus comprising:

a lens mounting mechanism according to any one of claims 1 to 6;

the lens barrel which is mountable and dismountable by the lens mounting mechanism; and an apparatus body to which the lens barrel is mounted.

* * * * *